Sept. 20, 1932.  G. MOORE  1,877,939
ART OF LIQUID PURIFICATION
Filed June 2, 1923  2 Sheets-Sheet 1

Inventor
George Moore
By Edgar M Kitchin,
his Attorney

Sept. 20, 1932.　　　　G. MOORE　　　　1,877,939
ART OF LIQUID PURIFICATION
Filed June 2, 1923　　　2 Sheets-Sheet 2

Inventor
George Moore

By Edgar M Kitchin
his Attorney.

Patented Sept. 20, 1932

1,877,939

UNITED STATES PATENT OFFICE

GEORGE MOORE, OF NEW YORK, N. Y.

ART OF LIQUID PURIFICATION

Application filed June 2, 1923. Serial No. 642,988.

This invention relates to improvements in the art of liquid purification, and more particularly to the effective elimination of germs as they collect or germinate, so as to provide a supply of pure liquid.

The object in view is the effective destruction of germs approaching a number or state endangering admixture of germs with discharging, otherwise purified liquid.

A further object is the carrying out of the last stated one by intermittent germicidal action for insuring delivery of purified liquid, and the accomplishing of the destruction of the germs in a quick, easy and effective manner.

The present improvement in the art stated is susceptible of being carried out with any of a great variety of apparatus, some few of which have been selected and illustrated in the accompanying drawings, and the structures therein shown will be described in detail as a convenient method of disclosure of the process or art herein covered.

In said drawings,—

Figure 3:
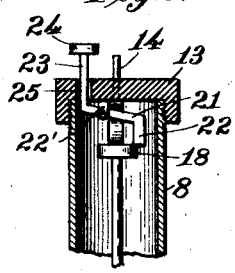
Figure 3 is a vertical section taken at right angles to the plane of the section of Figure 1 through a fragment of the circuit-closing apparatus and its operating means.

Referring to the drawings by numerals, 1 indicates a container or filter chamber in which is suspended a filter candle 2, preferably of the foraminous type, formed of earthy substance or coated with it, such as powdered barytes. One effective form of such candle is shown in Figure 3 of my Patent No. 1,309,330, dated July 8, 1919, and the mounting therein shown is also acceptable and effective, differing from that shown in Figure 1 of the accompanying drawings in that candle 2 is arranged with its discharge end at the top of container 1 instead of being at the bottom as seen in the patent, the arrangement being merely a matter of personal preference in any particular assemblage. The container 1 is closed at both ends and provided at its lower end with an intake or supply pipe 3 for the water or other liquid to be filtered. A valve 4 controls the intake of liquid to tank 1. A discharge pipe 5 leads from the upper or discharge end of the filter candle 2 through the top of the container 1 to any appropriate point of discharge, not illustrated. The pipe 5 communicates by means of a cap 7 with the discharge end of the candle 2, the cap 7 effectively sealing the ends of the candle and preventing access of liquid from the container 1 to the pipe 5 except through the walls of the candle 2. The water or other liquid flowing through pipe 3 into container 1 is delivered under pressure sufficiently high to cause the liquid in the container 1 to advance through the walls of the candle, so as to discharge as filtered liquid out through the pipe 5. And I find that the candle 2, when constructed as illustrated in my said patent, not only holds back all of the larger foreign substances, but also successfully filters out all germs, so that the discharged liquid is free from germs. With the average candle 2, formed as set forth in my said patent, its successful filtration and elimination of germs will continue for a variable period. After a period varying from two to thirty days, a small amount of germs begins to appear in the discharged water and increases with the further or continued use of the candle if no steps are taken to prevent. This is doubtless due to both lodgment of germs within the candle walls and germination occurring within those walls until the germs therein become sufficiently numerous to gradually find their way to the inner or discharge surface of the filter candle.

To prevent the discharge of germs and permit the continued use of the candle 2, after the time limit specified, is a specific object of the present invention, and, to that end, I provide for periodical destruction of germs within the walls of the filter candle 2.

A tubular container 8 is preferably arranged in an upright position adjacent container 1, and with its connected parts forms what may be called a thermostatic controlling apparatus. The lower end of container 8 is formed into an enlargement. A drain valve 9', preferably communicates with the lower end of container 8 to enable draining out the contents thereof when desired. A tube 9 extends through the enlarged lower end of container 8 and through the lower end portion of the container 1. An electrical heating unit 10, of any well known type, preferably cylindrical as shown, extends within the tube 9 through both the enlargement of the container 8 and the lower end portion of container 1. Electrical conductors 11 and 12 are connected with the unit 10 for supplying current thereto from a source not illustrated, and the conductors are preferably protected by a surrounding tubular casing 28 continuous of the tube 9 and either formed integral therewith or appropriately connected thereto.

Figure 1:
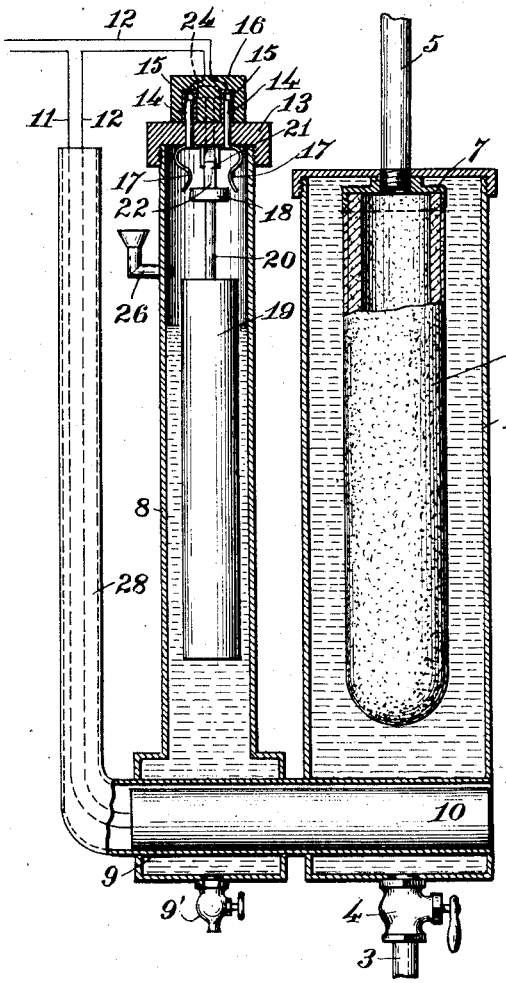
Figure 1 is a vertical sectional view through an apparatus well adapted for carrying out the process, parts being seen in elevation.
Figure 2:
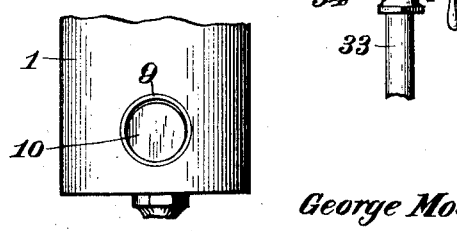
Figure 2 is a fragmentary elevation showing the electrical heating unit in end view.

The conductor 12 is provided with a circuit closing and opening switch in its length, which switch is susceptible of assuming any of various types, one detail form of which is illustrated in Figures 1 and 2. A cap or closure 13 is threaded or otherwise detachably fixed to the upper end of the container 8, and has extending therethrough metallic rods 14, 14, adapted to fit into and contact with metallic sockets 15, 15, carried by a switch block 16. The block 16 and cap 13 are preferably of hard rubber, fiber, or other appropriate non-conducting material, and one branch of the wire 12 leads to one of the sockets 15 while the other branch leads away from the other socket 15. The inner or lower ends of the bars 14 carry contact springs 17, 17, having downwardly-flaring terminal portions adapted to be engaged by a metal disc or plate 18 for closing the circuit of the unit 10. The flare or inclination of the terminal portions of springs 17 enables the plate 18, when pressed up between the springs, to be frictionally held thereby with sufficient resistance to separation of the plate 18 from engagement with springs 17 to insure sudden disnection under the action of the parts hereinafter described to avoid arcing at the points of contact of plate 18 with the springs 17. A float 19 preferably in the form of an elongated cylinder is arranged within the container 8 and provided at its upper end with an upstanding bar 20 of hard rubber, or other electric insulating material. To the upper end of the bar 20 is fixed the plate 18 so as to be carried thereby to and from a circuit closing position relative to the springs 17 by reason of variations in the level of the liquid within the container 8. As best seen in Figure 2, where the upper portion of the container 8 is illustrated with its cap 13 but with the switch block 16 removed, a detent lever 21 is seen pivoted to a pair of arms 22' depending from the under face of the cap 13.

The lever 21 is bent at its lower end to a downwardly-extending portion 22 just overhanging the margin of the plate 18, when the parts are in the position seen in Figure 3. The opposite end of the lever 21 is provided with an upstanding stem 23 terminating at its upper end in an operating button 24, the stem extending through an aperature 25 in the cap 13 so that the button 24 is easily accessible at all times outside of the cap 13 and at one side of the switch block 16. The depending end portion 22 of lever 21 is sufficiently weighted to insure the retention of the parts in the position seen in Figure 3 until varied by manual manipulation.

A filler tube 26 communicates with the container 8 at an appropriate point, preferably near the upper end thereof, and the said filler tube at its outer or free end preferably terminates in an enlargement or funnel for facilitating introduction of liquid through the tube into the container 8.

To carry out the present improved process by the utilization of apparatus such as is illustrated in Figures 1, 2 and 3, it is necessary only to turn on the liquid supply through the valve 4 and allow the filtered water to exhaust through pipe 5 until the limit of time is reached, during which filter 2 may be safely relied upon to hold back all germs, which time will ordinarily not be less than forty-eight hours. The water is delivered through the supply pipe to container 1 under relatively high pressure, but the resistance of the filter 2 is sufficiently great to cause the water to flow through pipe 5 at a relatively slow rate. When the time limit stated is reached, the operator closes valve 4 and introduces water through the filler tube 26 into container 8 until the float 19 is lifted to the position seen in Figure 1, wherein the contact plate 18 is stressed against the terminal portion 22 of lever 21 and held out of contact with springs 17 only by the functioning of said lever. The operator then presses the button 24 for releasing the plate 18 and its connected parts, and the said plate is then quickly forced up between the spring arms 17, the action of the float 19 being accomplished with sufficient speed for causing not only a reliable contact to be made between plate 18 and the springs 17, but for preventing any slowness of movement of the plate 18 as it approaches the springs 17. Thus any appreciable arcing is avoided. Just as soon as the circuit is thus closed, current flows through the unit 10 and begins to heat the contents of containers 1 and 8. The operator need give the apparatus no further attention until another period of time limit is reached when the filter 2 requires further treatment. With the parts in the position last stated, that is with the contact plate 18 wedged between the springs 17, the current continues to flow until the liquid contents of the container 1 is caused to boil. The temperature of the filter 2 is thus raised so high and maintained at such a point for such period of time as will effectively destroy all bacteria in the walls of the filter or on its surfaces.

The heating unit 10 will continue to heat the contents of container 1 until the circuit for the heat unit is broken. It will be observed, of course, that at the same time the liquid in container 1 is heated, the liquid in container 8 will also be heated, and when the liquid in container 1 reaches the boiling point, or possibly slightly before, the liquid in container 8 will also reach the boiling point. As the liquid in container 8 boils, the steam will escape through the intake pipe 26 from the container 8 and the level of liquid in container 8 will thus be gradually lowered. When sufficiently lowered, the float 19 will act as a weight, dropping sufficiently to break contact between plate 18 and the springs 17. This action, however, does not occur until the liquid level in container 8 is below the point where separation between plate 18 and springs 17 would ordinarily begin, because the frictional engagement between said springs and plate is sufficient to supplement the buoyancy of float 19 and retain the parts in the raised position until such time as will insure a sudden drop and thus a breaking of contact between plate 18 and springs 17 with a minimum amount of arcing. As soon as this drop occurs, the weighted end 22 of lever 21 will swing to position above the plate 18 and prevent the plate from again rising under any conditions into contact with springs 17 until the button 24 is a second time depressed for repeating the cycle of operation.

Figure 4:
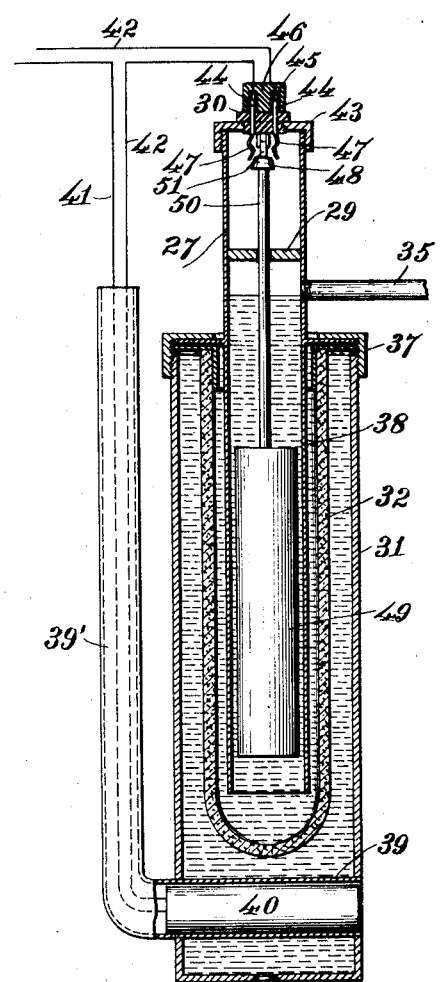
Figures 4, 5, 6 and 7 show, partly in side elevation and partly in section, modified embodiments of the apparatus.

A modified structure is illustrated in Figure 4 capable of utilization for carrying out the essential steps of the present improved process. This structure includes a container 31 for a filter 32. A supply pipe 33 communicates through a controlling valve 34 with the lower end of the container 31, and the discharge end of the filter 32 delivers filtered liquid through the discharge pipe 35. The filter 32 is suspended from an annulus 37 resting on a gasket arranged on the upper end of container 31. A sleeve 38 extends downwardly within and terminates just short of the lower end of filter 32, and is supported by an annular flange extending from the sleeve between annulus 37 and the cap or cover closing the upper end of container 31. The tube 38 is open at its lower end and is of a diameter sufficiently small to leave a relatively thin column of water between itself and the inner surface of the filter 32.

Extending through the lower end of the container 31 is a tube 39 in which is removably located a heating unit 40 of any appropriate and well known type. An electrical conductor 41 leads to the unit 40 and an electrical conductor 42 leads therefrom, the conductor 42 being provided with a circuit closing and opening apparatus hereinafter described. A preferably tubular casing 39' is formed integral with, or appropriately connected to, the tube 39 and extends upwardly therefrom and encloses the conductors 41 and 42 to protect the same against possible injury. The sleeve 38 extends upwardly from its supporting flange through the cap or cover which closes the upper end of container 31, forming an extension 27. A rigid diaphragm or partition 29 is arranged within the extension 27 for limiting the possible extent of rise of liquid from the discharge end of filter 32. A cap or closure 43 is threaded or otherwise fixed to the upper extremity of the extension 27, and is penetrated by a detachably mounted insulating plug 30 carrying the conductor bars 44 detachably extending into metallic sockets 45 arranged in the switch block 46. One branch of conductor 42 extends to one of the sockets 45 while the other branch extends from the other socket 45, so that, when the switch block 46 is in place as seen in Figure 4, contact is established through both branches of conductor 42 with the two spring contact pieces 47, 47, corresponding in shape and function with the springs 17. A contact plate 48 is arranged to be moved into and out of contact with the springs 47 after the manner of the operation of the plate 18 by the action of a cylindrical float 49 having an insulating stem 50 carrying the plate 48. The float 49 is arranged within the tube 38 and the stem 50 extends upwardly through the partition or diaphragm 29 to a point just below the springs 47.

A lever 51 constructed and mounted to function identically like lever 21 is carried by the cap 43 and arranged to have its weighted end normally retaining the contact plate 48 in its lowered position as seen in Figure 4.

During the regular filtering operation, the parts are in the position indicated in Figure 4, and when the time limit has been reached for the safe use of the filter 32, the operator merely releases the detent lever 51 exactly in the same manner in which lever 21 is released, and thereupon the plate 48 rises through the action of the buoyancy of float 49 until it is quickly pressed between the springs 47, where it will be held by friction until the tendency on the part of the float 49 to drop is sufficiently great to insure effective clearance between the plate 48 and springs 47 without any such slow movement as will produce any appreciable amount of arcing. As soon as the operator has released the detent lever 51 and the plate 48 has closed the circuit through the springs 47, the unit 40 begins to heat and the heating action continues until the liquid within the container 31 and within the filter 32 begins to boil. While boiling, a certain amount of steam escapes through the discharge pipe 35, but if the apparatus were to be retained in the condition for boiling the contents of container 31 until the liquid level had dropped sufficiently for breaking the circuit, the delay would be excessive. The apparatus is, therefore, constructed to obviate the necessity for waiting for such action. The operator closes the valve 34 at the same time that he releases the detent lever 51, so that, when steam begins to form in the container and in the filter, there will be no release of back pressure through the pipe 33. Therefore, the liquid within the filter 32 outside of the tube 38 will have its surface depressed by the steam forming within the filter and outside of the tube 38. The water flows downward and into the tube 38, and thence upward and out through the discharge pipe 35. This action in a comparatively short time discharges a sufficient quantity of water to allow the float 49 to drop to the circuit breaking position seen in Figure 4, but, in the meanwhile, ample opportunity has been afforded for insuring an antiseptic condition of the filter 32. As soon as the parts drop to the position seen in Figure 4, they begin to cool off as the supply of current to the unit 40 is discontinued. The weighted end of the detent lever 51 insures automatic movement of the lever to the detent position in the same manner as is shown with respect to lever 21 in Figure 3, and the lever 51 retains this position until again manually released.

Figure 5:
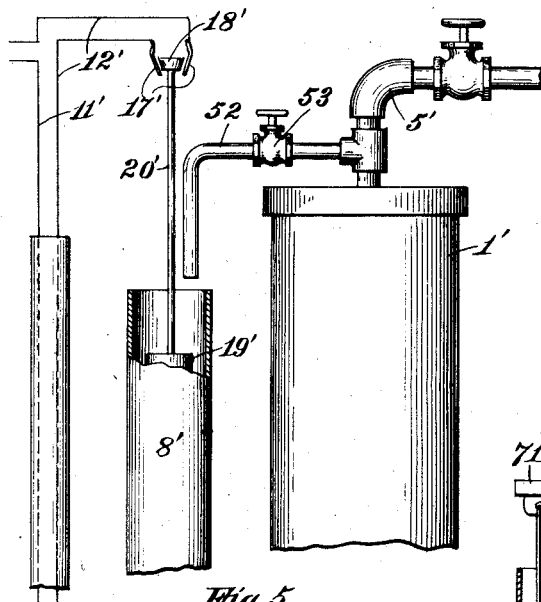

In Figure 5 the lower parts of the apparatus are constructed identically as shown in Figure 1, and the said parts are, therefore, broken away, but the upper parts differ slightly in that the discharge pipe 5' leading from the filter housing or container 1' is provided with a discharge outlet 52 having a control valve 53. The upper end of the container 8' is not closed but left open, and arranged beneath the discharge end of the pipe 52. The float 19' within the container 8' is provided with an insulating stem 20' carrying at its upper end a contact plate 18', arranged to stand above the contact springs 17', 17' (seen diagrammatically in Figure 5) when the circuit is broken. The said springs form parts of the conductor 12', which with conductor 11' supply current to the heating unit of the type seen at 10 in Figure 1, but not illustrated in Figure 5. It is to be observed that because the contact plate 18' is sustained above the springs 17' by the float 19', contact is effected only by lowering of the float. Therefore, when it is desired to sterilize the filter within container 1', it is only necessary for the operator to open the drain valve of container 8', such as seen at 9' in Figure 1, and allow the liquid level of the container to drop until the plate 18' is in effective contact with the springs 17'. He then closes the drain valve and opens the valve 53. The discharge control valve of pipe 5' may be left open or closed, as desired, and if open will not interfere with the functioning of pipe 52, since the discharging liquid will be delivered through the first point of discharge, which will be pipe 52 when valve 53 is open. When the contents of the container 1' has boiled sufficiently, the liquid discharging through pipe 52 will raise the liquid level in the container 8' sufficiently for elevating the float 19' to an extent adequate to cause the plate 18' to lift out of contact with springs 17', whereupon the valve 53 is closed by the operator and the filtering operation continues as prior to the sterilizing operation. It is to be observed in connection with the operation of the structure seen in Figure 5, that the amount of discharge from the container 8' will control the extent of time during which the heating of the filter within the container 1' will continue, and the operator will soon acquire skill in varying the time as he may desire by varying the quantity drained from container 8'. In this construction, there is preferably used also a tube which is not illustrated, but which corresponds to tube 38 of Figure 4, and which is used to accelerate the discharge of water. In this instance, however, the accelerating tube has no upper extension above its supporting flange.

Figure 6:
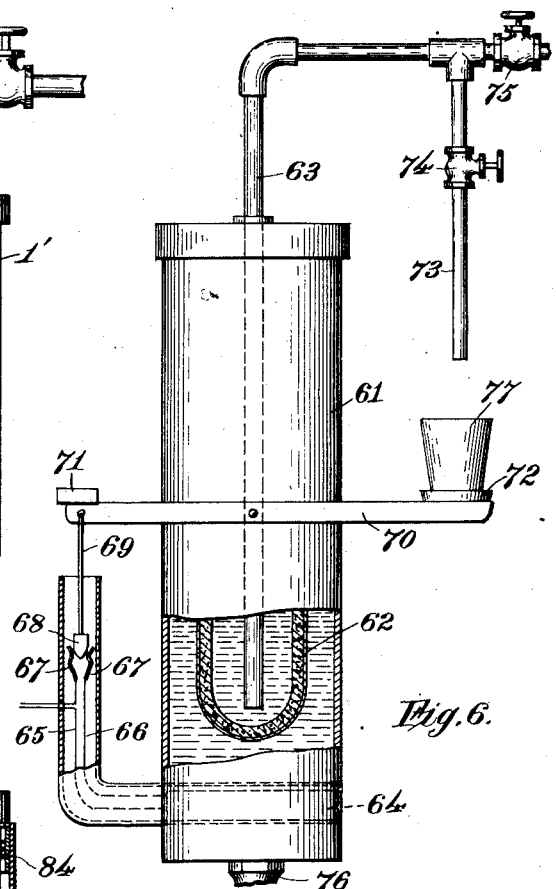

Referring to Figure 6, the filter container 61 is provided with the usual filter 62, but in this construction the discharge pipe 63 is extended downward to near the lower or closed end of the filter 62, and is thus adapted to function as a discharge accelerating tube like tube 38. A heating unit 64 is arranged in a tube extending through the lower end of container 61 and supplied with current through conductors 65 and 66 in the length of one of which are arranged the spring contacts 67 adapted to have the circuit closed therethrough by a contact plate 68 carried by an insulating stem or rod 89 suspended from an operating lever 70, which is pivoted to the container 61 and provided at that end carrying the stem 69 with a counter-balance weight 71. At the opposite end, the lever 70 is provided with a tray 72 adapted to support an open-end container or cup 77, arranged beneath the discharge end of a delivery pipe 73 leading from the main discharge pipe 63. Pipe 73 is provided with a control valve 74, while pipe 63 is provided with a control valve 75.

In operation, the cup 77 is normally left filled with water, or other liquid being treated, so as to overbalance the weight 71 and retain the plate 68 out of contact with springs 67. When it is desired to sterilize the filter 62, it is only necessary to empty the cup 77 and replace it. The cup end of lever 70 being thus lightened will allow the weight 71 to press the opposite end of the lever downward and cause the plate 68 to close the circuit of the heating unit 64. The valve 74 is opened and the control valve, not shown, of the intake or supply pipe 76 for container 61 is closed. The heating of the contents of container 61 continues until the steam generated in the upper portion of filter 62 forces the liquid in the filter downward and into the discharge pipe 63 and upward therein and out to the branch 73 and into the cup 77. As soon as a sufficient quantity of liquid accumulates in the cup 77 to overbalance weight 71, and overcome friction of the engagement between plate 68 and springs 67, the cup end of lever 70 will swing downward, and the plate 68 will thereby be moved upward and out of contact with springs 67. The valve 74 is then closed by the operator and the supply pipe valve to container 61 is also opened. If the valve 75 was closed during the sterilizing operation, it will also be opened and the filtering operation will progress as above.

Figure 7:
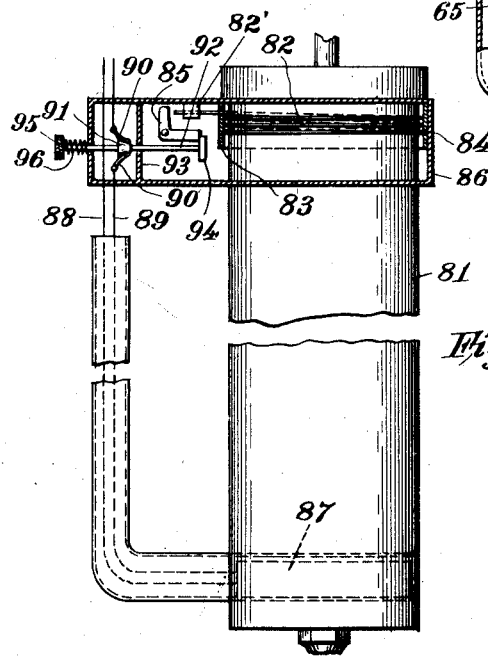

In Figure 7 is illustrated, fragmentarily, apparatus for carrying out the process by a metallic thermostat instead of a hydro-thermostat. The container 81 for the filter is surrounded by a coil of wire 82 enclosed in an annulus or band 83 of metal or other appropriate material adapted to prevent radial expansion of the coil 82, so that the wire of said coil will be elongated incident to heating action. One end of the coil is anchored, as at 84, in the band or collar 83, while the other end portion is formed with a projection extending through said band to a point normally near or contacting with a bell crank lever 85 pivoted to the housing 86, which surrounds the upper portion of the container 81 and encloses the coil 82 and its connected parts. The projection of the last-named end portion of coil 82 is preferably restrained against lateral play by an appropriate guide 82'. A heating unit 87 is arranged in the lower end portion of container 81 and is provided with current supply conductors 88 and 89, in one of which are arranged the spring contacts 90, 90. A contact plate 91 is adapted at times to close the circuit between the springs 90. The plate 91 is carried by an insulating stem 92 extending through the housing 86 and a partition 93 thereof, and at its inner end being provided with a cross bar or disc 94 located to be engaged by the free end of the horizontal arm of the bell crank lever 85, which retains the stem 92 in position for maintaining contact of plate 91 with springs 90. The stem 92 extends beyond the housing 86 and is provided with a thumb nut or button 95, and is surrounded by a coiled spring 96 arranged between the button 95 and the housing 86 to stress the stem 92 in a direction for moving plate 91 out of contact with springs 90. The horizontal or lower arm of the bell crank lever 85 is sufficiently weighted to retain the upper arm in contact with the free end of the projection of the end portion of coil 82. It is obvious, of course, that the bell crank lever is free to swing upon its pivot for moving the upper arm in a direction outward and away from said projecting end of coil 82, so that, when the button 94 is in its outer position as normally retained by the spring 96, the operator, desiring to sterilize the filter within container 81, presses the button 95 inward. The button 94 is thus caused to move along the horizontal arm of bell crank lever 85 to a point beyond the same, as indicated in Figure 7, whereupon the lever drops into the position with the vertical arm contacting with the extension of the coil 82. When the parts are in this position, as seen in Figure 7, the circuit of heating unit 87 is closed and the sterilizing action begins. This action continues until the expansion of the coil 82 causes a sufficient outward thrust of the projecting end of the coil to push the vertical arm of lever 85 a distance adequate to cause the horizontal arm to move from the position seen in Figure 7 to a raised position out of contact with the button 94. Immediately thereupon, the spring 86 functions to withdraw the plunger 92 and to break the contact between the springs 90.

What is claimed is:—

1. In the art of liquid purification, passing liquid through a filter temporarily impervious to germs, and destroying accumulated and generated germs on or in the filter before any of the germs find their way through the filter while retaining the filter in its operative position.

2. In the art of liquid purification, passing liquid through a filter that is germ impervious for a limited period of operation, heating the filter to the point of sterilization prior to the termination of such period, and electrically controlling the heat for terminating the supply thereof upon completion of the sterilization.

3. In the art of liquid purification, passing liquid through a filter that is germ impervious for a limited period of operation, sterilizing the filter prior to the termination of such period, electrically controlling the sterilizing action, and hydraulically actuating the electrical control.

4. In the art of liquid purification, passing liquid through a filter that is germ impervious for a limited period of operation, and heating the filter to a point of sterilization of the filter before the expiration of said period.

5. In the art of liquid purification, passing liquid from a surrounding column of liquid through a filter which is germ impervious for a period of operation, and raising the temperature of said column of liquid to the sterilizing point prior to the termination of said period.

6. In the art of liquid purification, passing liquid through a filter that is germ impervious for a period of operation and sterilizing the filter before the termination of such period while retaining substantially the same relation of the filter to the liquid to be filtered maintained during the filtering operation.

7. In the art of liquid purification, passing liquid from a surrounding column through a filter that is germ impervious for a period of operation, and sterilizing the filter prior to the termination of such period while retaining the same surrounded by the column of liquid.

8. In the art of liquid purification, passing liquid through a filter that is germ impervious for a period of operation, sterilizing the filter prior to the termination of such period, and utilizing the sterilizing agency to discontinue the sterilizing action.

9. In the art of liquid purification, alternately passing liquid through a filter impervious to bacteria for a period of operation, and sterilizing the filter prior to the termination of such period without varying the operative relation of the filter to the liquid to be filtered for enabling a substantially continuous discharge from the filter of germ-free liquid.

10. In the art of liquid purification, passing liquid through a filter that is germ impervious for a period of operation, electrically heating the filter to the point of sterilization prior to the termination of such period, and manipulating fluid for breaking the circuit of the electrical heater.

11. In the art of liquid purification, alternately passing liquid through a filter medium for a limited period short of the discharge of germs from the discharge surface of the filter, and sterilizing the filter medium while retaining the filter medium in a fixed relation to liquid supply and discharge apparatus.

12. In the art of liquid purification, maintaining a filter which is temporarily impervious to bacteria continuously in operative relation to liquid supply means for enabling continuous filtering of liquid through said filter, destroying the bacteria in the material of the filter at intervals without interrupting the operative relation of the filter, timing the intervals between the bactericidal actions to less than the time required for bacteria to completely penetrate the filter, and timing each bactericidal action to a minimum sufficient for destruction of bacteria within the material of the filter.

In testimony whereof I affix my signature.
GEORGE MOORE.